(12) United States Patent
Lee et al.

(10) Patent No.: US 7,085,336 B2
(45) Date of Patent: Aug. 1, 2006

(54) SIGNAL TRANSMISSION CIRCUIT AND METHOD FOR EQUALIZING DISPARATE DELAY TIMES DYNAMICALLY, AND DATA LATCH CIRCUIT OF SEMICONDUCTOR DEVICE IMPLEMENTING THE SAME

(75) Inventors: Jung-bae Lee, Kyunggi-do (KR); Kyu-hyoun Kim, Kyunggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1008 days.

(21) Appl. No.: 09/875,364

(22) Filed: Jun. 5, 2001

(65) Prior Publication Data

US 2001/0055344 A1 Dec. 27, 2001

(30) Foreign Application Priority Data

Jun. 26, 2000 (KR) .............................. 2000-35335

(51) Int. Cl.
*H04L 7/00* (2006.01)

(52) U.S. Cl. .................................................. 375/354

(58) Field of Classification Search ................ 375/257, 375/259, 285, 355, 356, 362, 371, 354; 370/503, 370/508, 519; 333/144, 152, 156, 164; 327/152–153, 327/158, 161
See application file for complete search history.

(56) References Cited

U.S. PATENT DOCUMENTS

| 4,481,647 | A |   | 11/1984 | Gombert et al. |
| 5,621,774 | A | * | 4/1997 | Ishibashi et al. ............ 375/371 |
| 5,636,254 | A | * | 6/1997 | Hase et al. .................. 375/371 |
| 5,724,392 | A | * | 3/1998 | Klimek et al. ............... 375/257 |
| 6,049,239 | A |   | 4/2000 | Eto et al. |
| 6,078,623 | A | * | 6/2000 | Isobe et al. .................. 375/259 |
| 6,169,435 | B1 | * | 1/2001 | Fujii et al. ................... 327/261 |
| 6,240,139 | B1 | * | 5/2001 | Cao et al. .................... 375/257 |
| 6,307,906 | B1 | * | 10/2001 | Tanji et al. .................. 375/376 |
| 6,370,200 | B1 | * | 4/2002 | Takahashi .................... 375/257 |
| 6,630,850 | B1 | * | 10/2003 | Eto et al. ..................... 327/141 |

* cited by examiner

*Primary Examiner*—Khanh Tran
(74) *Attorney, Agent, or Firm*—Marger Johnson & McCollom, P.C.

(57) ABSTRACT

A signal transmission circuit and a method equalize differential delay characteristics of two signal transmission lines. A controllable delay unit is connected serially to the second line, so as to compensate by adding its internal delay. An auxiliary signal transmission line replicates the second transmission line, while it processes the input signal of the first. A controlling unit compares the output signal of the first transmission line and the of the auxiliary signal transmission line, and adjusts dynamically the internal delay of the controllable delay unit, to attain continuous synchronization. A data latch circuit synchronizes the delays of data paths by having one controllable delay units in each of the data paths.

29 Claims, 13 Drawing Sheets

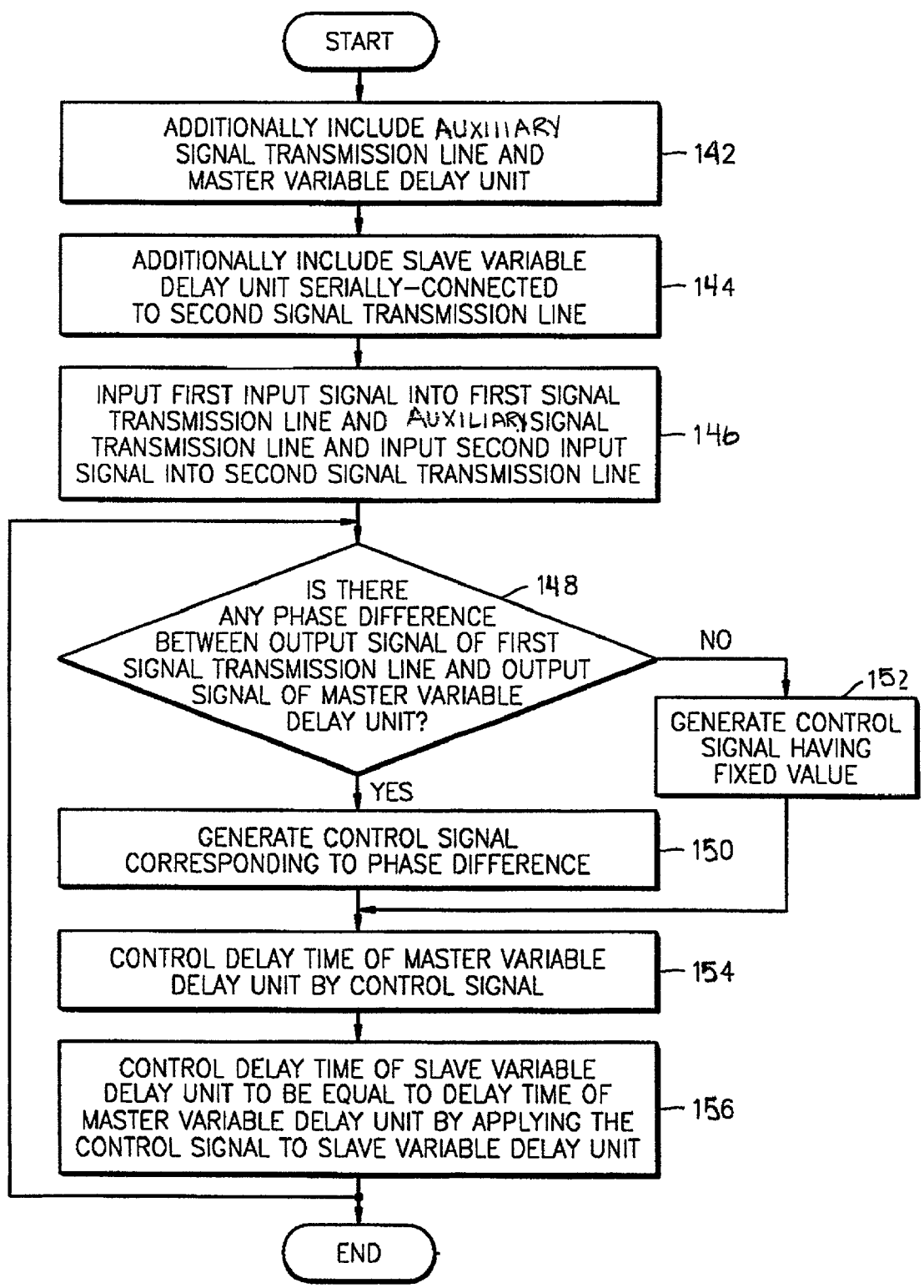

SIGNAL TRANSMISSION CIRCUIT AND METHOD FOR EQUALIZING DISPARATE DELAY TIMES DYNAMICALLY, AND DATA LATCH CIRCUIT OF SEMICONDUCTOR DEVICE IMPLEMENTING THE SAME

BACKGROUND OF THE INVENTION

1. Field of the Invention.

The present invention relates to an electrical circuit, and more particularly, to a signal transmission circuit and a method for equalizing disparate delay times of signal transmission paths having different delay characteristics, and a data latch circuit of a semiconductor device implementing the same.

2. Description of the Related Art.

When a signal is transmitted via a signal transmission path, it experiences a delay. The time of the delay depends on the individual characteristics and structure of the signal transmission path. Since the resistance and capacitance of the signal transmission path vary, the delay time varies. However, in a circuit such as a data latch circuit for latching data, at the point in time synchronized with a clock signal, it is necessary for two signals or more signals to be input at the same point in time. Thus, it is necessary for the delay times of signal transmission paths having different delay characteristics to be equalized.

Referring to FIG. 1, two signal transmission paths A–A' 12 and B–B' 14 are shown. The delay time of the A–A' signal transmission path 12 is T1. The delay time of the B–B' signal transmission path 14 is T2, a time less than T1. Since they are different, a compensation scheme is required for equalizing the disparate delay times T1, T2.

Referring to FIG. 2, a scheme is shown for compensating for the time difference between T1, T2. The scheme involves inserting an additional delay element into the B–B' signal transmission path 14. The additional delay element is inverter chain 26. In another technique, the delay element is a resistance-capacitance R-C device.

The following are examples of signal transmission circuits, which have different delay characteristics.

FIG. 3A shows a case where output capacitances Ca and Cb of two signal transmission paths A–A' and B–B' are different. FIG. 3B shows a case where serial resistances Ra and Rb of the two signal transmission paths A–A' and B–B' are different. Even if capacitors C3B are similar, different R-C time constants are generated.

FIG. 3C shows a case where merely the interconnection lengths Ta and Tb of the two signal transmission paths A–A' and B–B' are different. This alone generates a difference in delay times. FIG. 3D shows a case where the types of gates of the two signal transmission paths A–A' and B–B' are different. FIG. 3E shows a case where the types of gates are similar, but the numbers are different.

FIG. 4 shows a related problem in the prior art, which is a circuit for latching by adjusting four data B1, B2, B3, B4 to one clock signal A. A clock signal A is input to four latch elements, and each of data B1 through B4 is input to one latch element corresponding to each of the data. The problem is that fan out of the input buffer for clock signal A is 4, while fan out of input buffer for each of data B1 through B4 is 1. So, the delay times of the clock signal A and the data B1 through B4 are different, because of the differential fan out between input buffer for clock and input buffer for data. In this case, data setup/hold time of each of the latch elements deteriorates. Thus, the overall operation speed decreases.

The problem of disparate delay times is pervasive. Solutions, such as those of FIG. 2 work only in part, and not continuously. That is because the delay time of an added delay device is subject to variances. The variances may arise by a difference in a semiconductor device manufacturing process, an applied voltage, and/or a temperature during operation. Accordingly, it is not easy to compensate precisely for the differences in delay time, or to maintain the compensation during operation.

SUMMARY OF THE INVENTION

The invention overcomes these problems in the prior art.

Generally, the invention provides first and second signal transmission paths, having first and second delays respectively. An auxiliary signal transmission path additionally receives the input signal of the first path, and produces a first temporary signal that is delayed it by a third time delay related to the second time delay. A controlling unit senses the difference in delays between the outputs of the first path and the auxiliary path, and outputs a delay adjustment signal. A controllable delay unit receives the delay adjustment signal, and adjusts accordingly its internal delay. The controllable delay unit receives the output from the second path, and further delays it by its internal delay to match the delay of the first path.

In the preferred embodiment, the auxiliary signal transmission path is a replica of the second transmission path. Accordingly, the third delay is always identical to the second delay, notwithstanding the parameters that introduce variances in the embodiments of the prior art. Due to these connections, exact compensation may be attained, which results in synchronization. Further, the synchronization is maintained even if operating conditions vary during performance.

An application of the invention includes a data latch circuit. Synchronization may happen with all the data, regardless of a differential fan-out of a clock signal.

This and other features and advantages of the invention will be better understood in view of the Detailed Description and the Drawings, in which:

BRIEF DESCRIPTION OF THE DRAWINGS

FIG. 13 is a flowchart illustrating a signal transmission method according to an embodiment of the present invention.

DETAILED DESCRIPTION OF THE INVENTION

The invention is now described in more detail.

Figure 1:
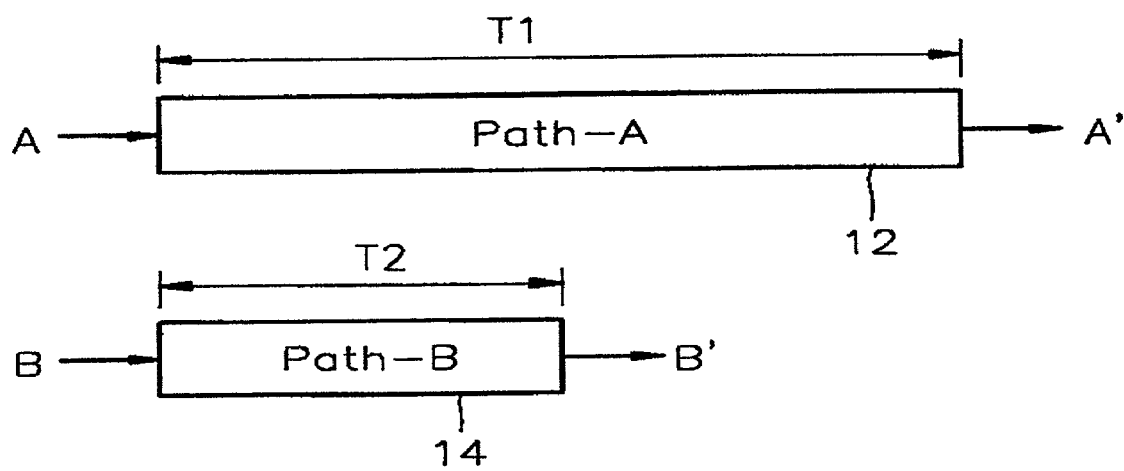
FIG. 1 is a simplified diagram of two signal transmission paths having different time delay characteristics.
Figure 2:
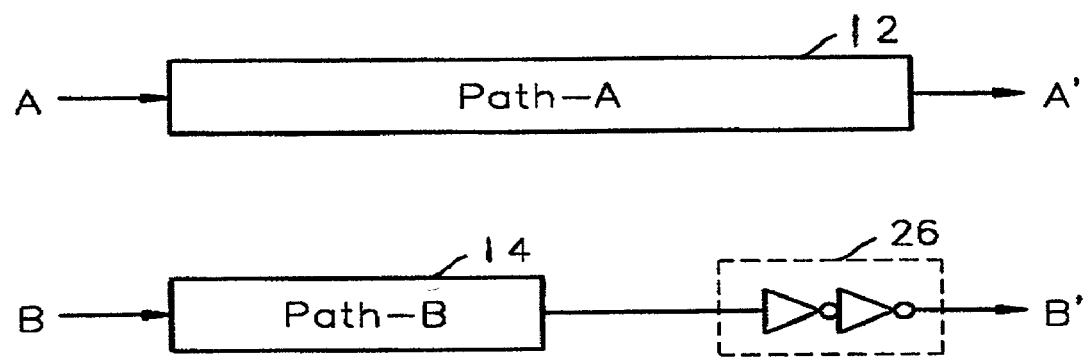
FIG. 2 is a diagram illustrating an example of compensating for the different delay characteristics in FIG. 1 according to the prior art.
Figure 3A:
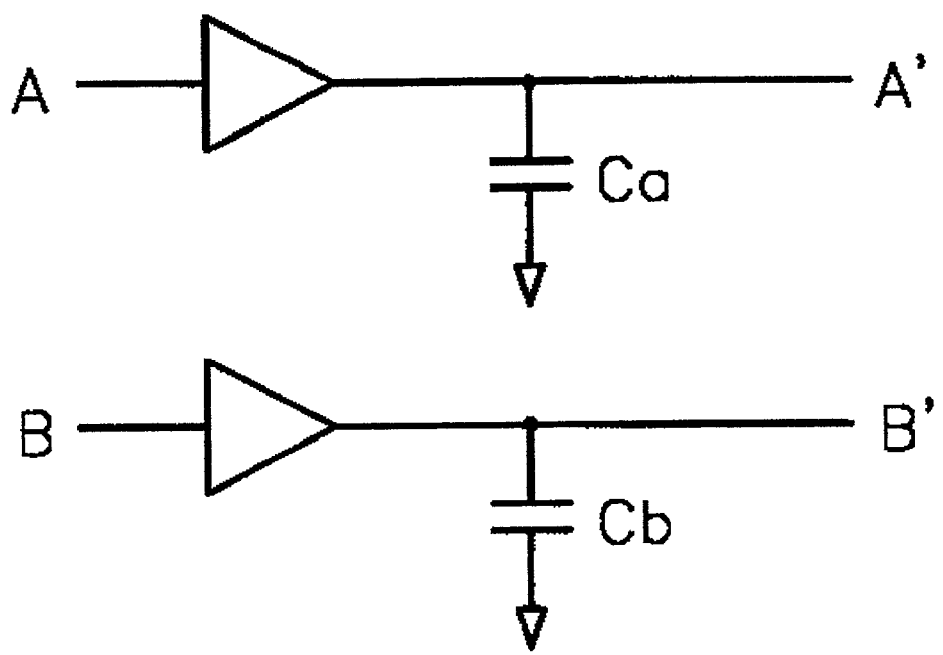
FIG. 3A through FIG. 3E are diagrams illustrating examples of pairs of signal transmission circuits having different delay characteristics.
Figure 3B:
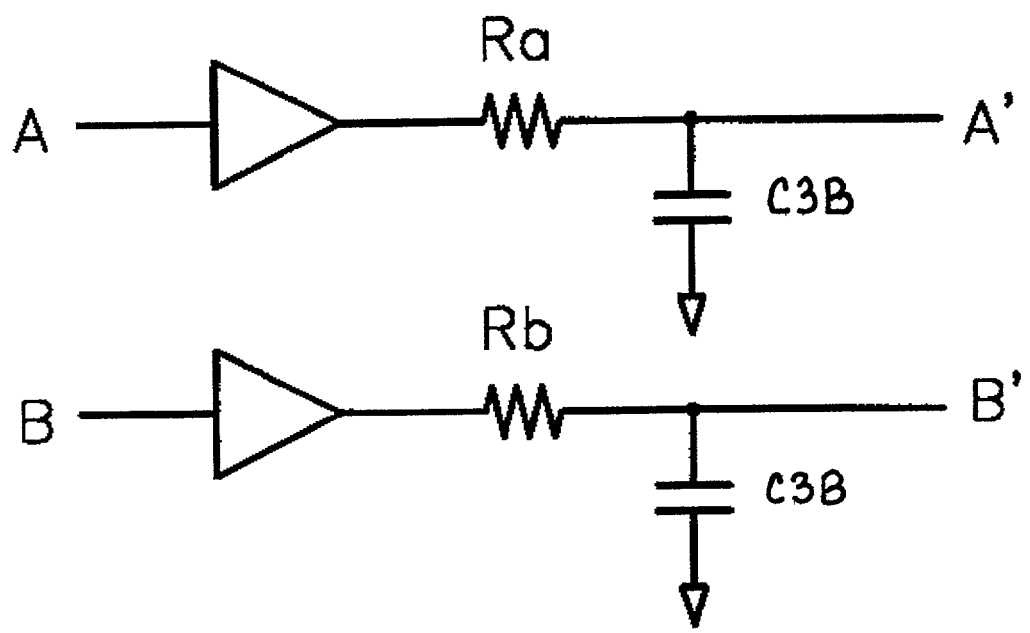
Figure 3C:
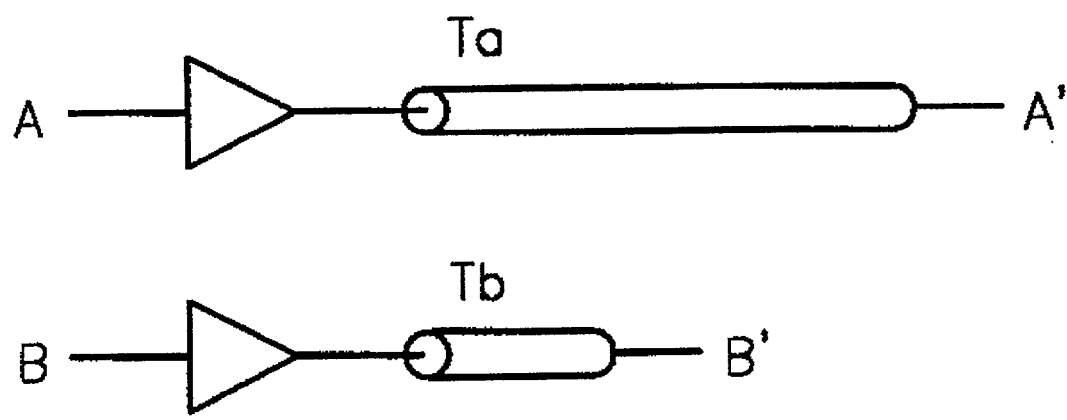
Figure 3D:
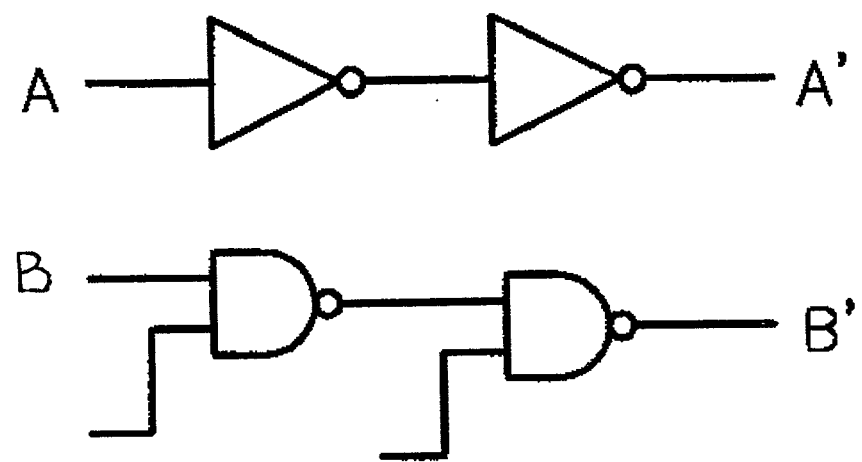
Figure 3E:
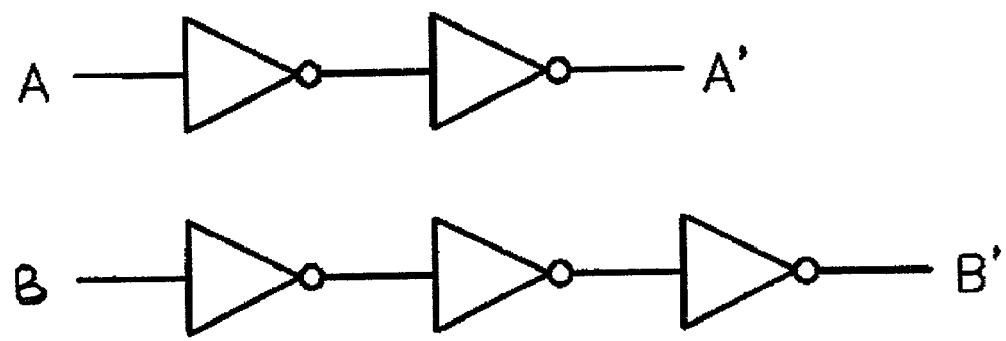
Figure 4:
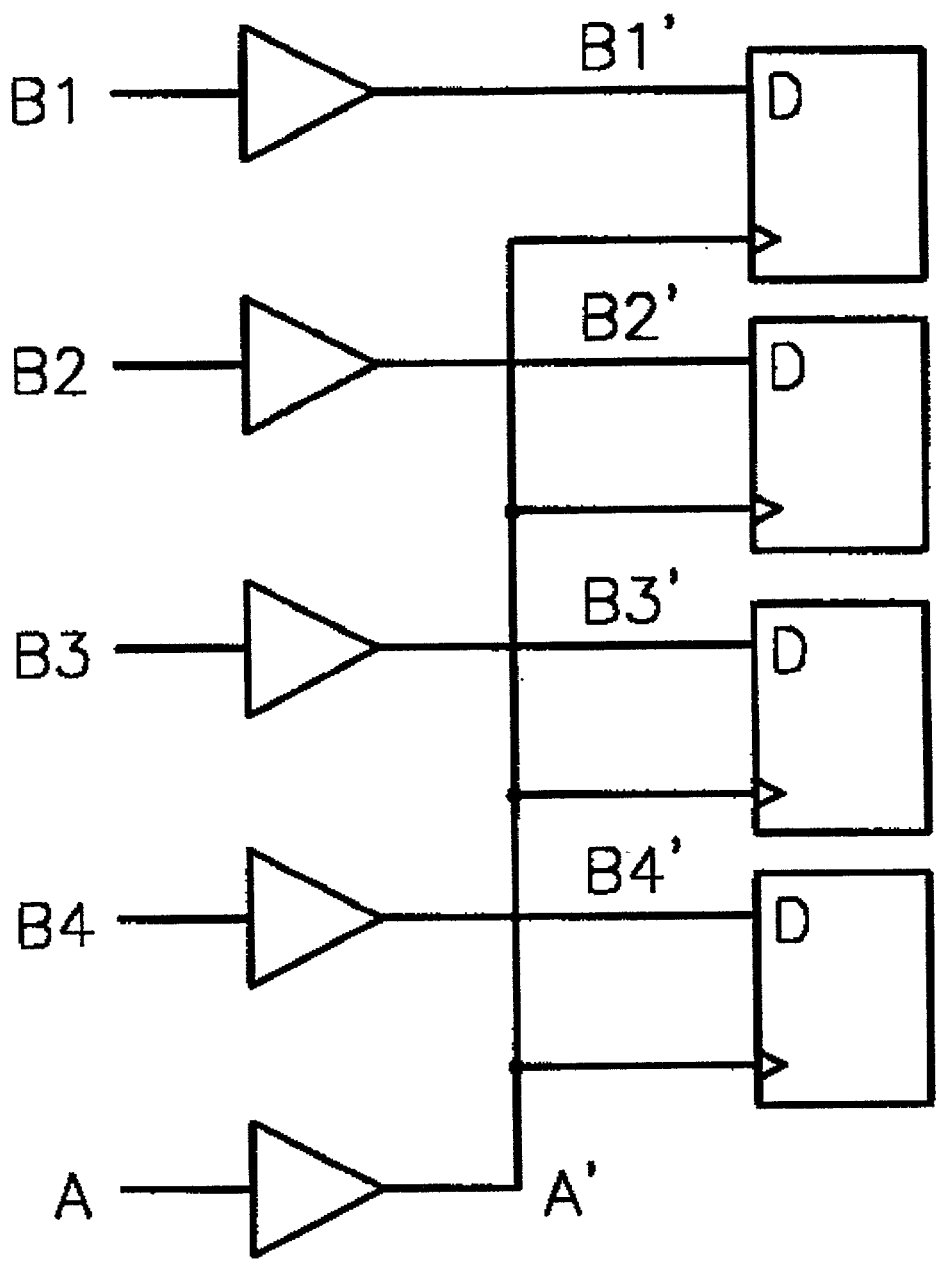
FIG. 4 is a diagram illustrating a data latch circuit of a semiconductor device in the prior art.
Figure 5:
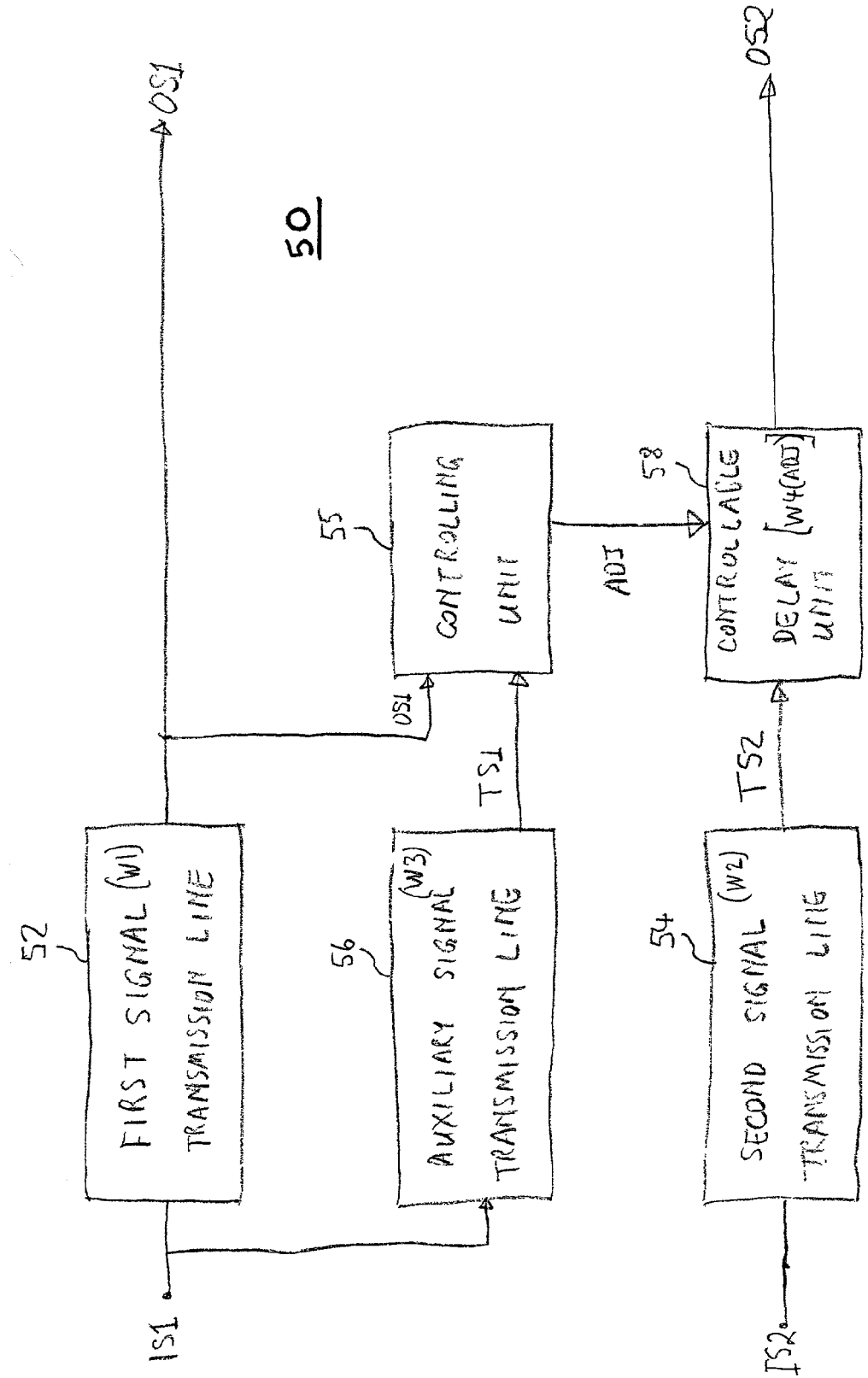
FIG. 5 is a diagram illustrating a signal transmission circuit according to a general embodiment of the present invention.

Referring now to FIG. 5, a general embodiment according to the invention is described. A signal transmission circuit 50 includes first and second signal transmission paths 52 and 54. These may be made in any way known in the art, such as in the ways shown in FIG. 3A through FIG. 3E.

Signal transmission paths 52 and 54 receive input signals IS1, IS2. First signal transmission path 52 outputs a corresponding output signal OS1, with a first delay W1. Second signal transmission path 54 outputs a corresponding temporary signal TS2, with a second delay W2. It is assumed that the second delay W2 is shorter than the first delay W1. If not, then circuit 50 is configured equivalently in the inverse way.

Importantly according to the invention, circuit 50 also includes an auxiliary signal transmission path 56. In the preferred embodiment, path 56 is a replica of path 54, although that is not necessary for practicing the invention. By replica it is meant made by the same components, arranged so as to result in the same delay time. This ensures that auxiliary signal transmission path 56 serves better as a reference.

Auxiliary signal transmission path 56 receives input signal IS1, and outputs a temporary signal TS1. Signal TS1 is delayed by a third delay W3, which is associated with the second delay W2. In the event that path 56 is a replica of path 54, then the third delay W3 equals exactly the second delay W2. This is advantageous for implementing the preferred embodiment of the invention.

Moreover according to the invention, circuit 50 includes a controlling unit 55. Controlling unit 55 receives signals OS1, TS1, and senses a time difference between them. Unit 55 then outputs a delay adjustment signal ADJ depending on the sensed time difference. Since the signals are received continuously, the delay adjustment signal ADJ may vary with time.

Further according to the invention, circuit 50 includes a controllable delay unit 58. Controllable delay unit 58 receives delay adjustment signal ADJ from controlling unit 55, and in turn adjusts its internal delay W4. Since W4 depends on delay adjustment signal ADJ, it is sometimes denoted as W4(ADJ).

Controllable delay unit 58 also receives signal TS2, and outputs a corresponding second output signal OS2. OS2 is delayed by internal delay W4 of unit 58.

In the preferred embodiment, the internal delay W4 is such that second output signal OS2 is delayed by the exact same amount as output signal OS1. In other words, the first delay W1 equals the sum of the second delay W2 and the internal delay W4. Accordingly, the internal delay W4 of unit 55 equalizes the delay times of the first and second output signals.

The matching of the delays is whether or not auxiliary signal transmission path 56 is a replica of second signal transmission path 54. It is highly preferred that it is indeed a replica, which will make it a better match.

The controlling unit 55, along with the controllable delay unit 58 may be implemented in various forms, both digital and analog. Some of these forms are given as examples of particular embodiments of the invention.

Figure 6:
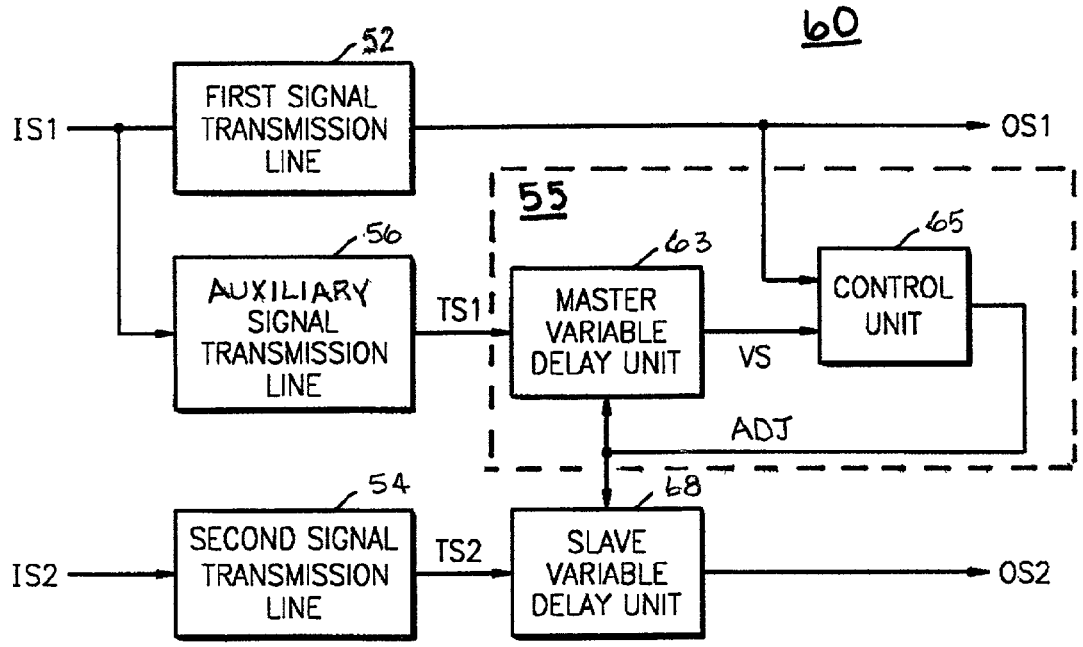
FIG. 6 is a diagram illustrating a first particular embodiment of the signal transmission circuit of FIG. 5 according to the present invention.

Referring now to FIG. 6, a circuit 60 is described according to a first particular embodiment. Controllable delay unit 58 (of FIG. 5) is implemented in FIG. 6 by a slave variable delay unit 68.

Controlling unit 55 includes a master variable delay unit 63. Unit 63 is adapted to receive the first temporary signal TS1. Unit 63 outputs an output signal VS corresponding to the received first temporary signal TS1, and which is delayed by a master internal delay of unit 63. In addition, the master internal delay is controlled by the same adjustment control signal ADJ used to control the internal delay of slave variable delay unit 68.

Controlling unit 55 also includes a control unit 65. Unit 65 is adapted to receive output signal VS, and the first output signal OS1. Unit 65 then generates the adjustment control signal ADJ in response to the received signals.

In the preferred embodiment, controlling unit 55 implements a feedback loop. By dynamically adjusting the adjustment control signal ADJ, unit 65 controls the master internal delay of unit 63 to equal the internal delay of slave variable delay unit 68. The feedback loop results in the phase of the second output signal OS2 to remain the same as the phase of the first output signal OS1. This occurs because the phase of the first output signal OS1 is made to track the phase of output signal VS, and the phase of output signal VS is in turn made to track the phase of second output signal OS2.

The feedback loop is best accomplished by constructing master variable delay unit 63 identically to slave variable delay unit 68. This enables a single signal ADJ to work for both the master variable delay unit 63 and the slave variable delay unit 68.

Figure 7:
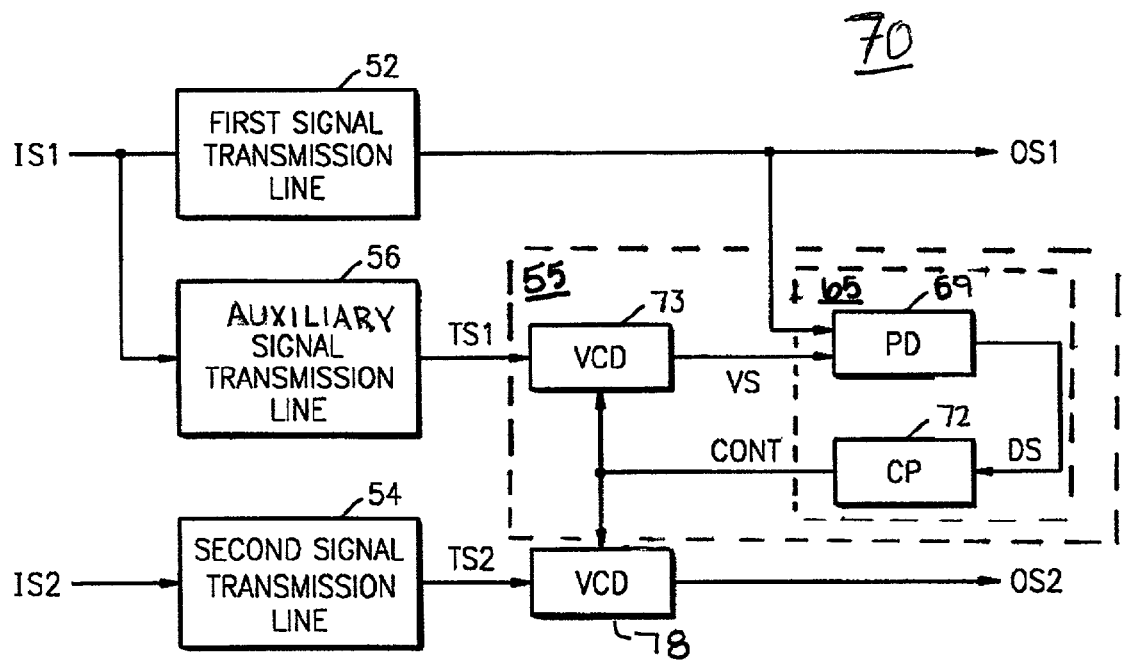
FIG. 7 is a diagram illustrating a second particular embodiment of the signal transmission circuit of FIG. 5 according to the present invention.
Figure 8:
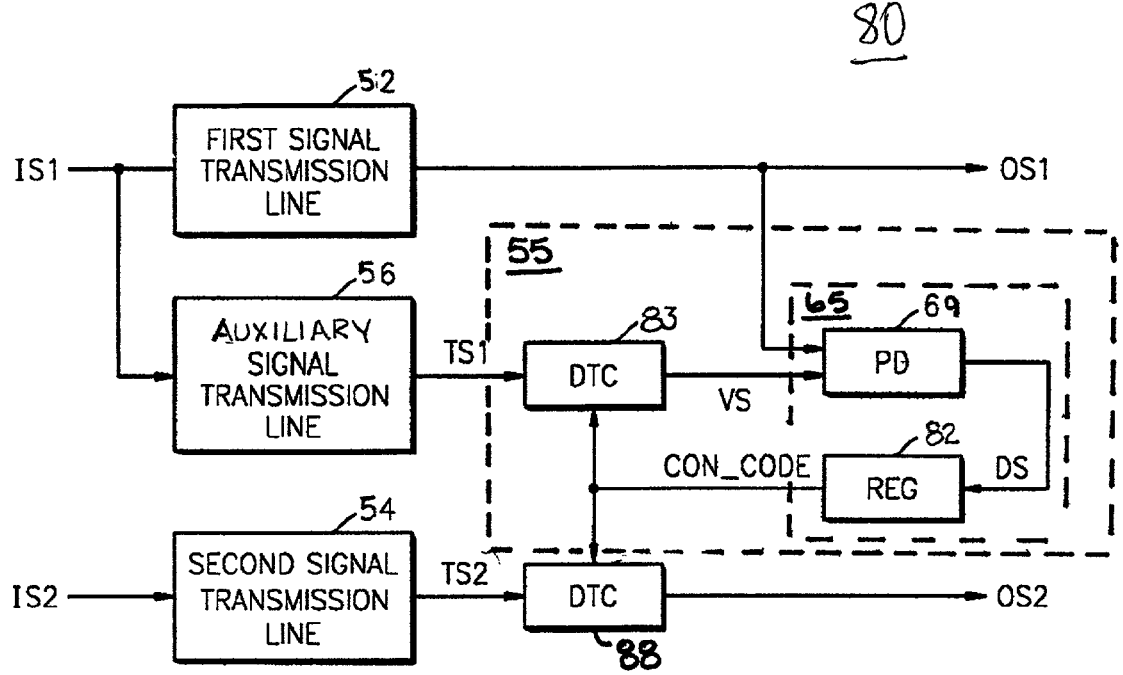
FIG. 8 is a diagram illustrating a third particular embodiment of the signal transmission circuit of FIG. 5 according to the present invention.

Referring now to FIG. 7 and FIG. 8, circuits 70 and 80 respectively are described, made according to a second and a third particular embodiments of the invention. They are respectively an analog and a digital version of circuit 60.

Both circuits 70, 80 have in common a phase detector 69 within control unit 65. In each case, phase detector 69 is adapted to detect a phase difference between the first output signal OS1 and the output signal VS of the master variable delay unit in the circuit. (In each case, the output signal of the master variable delay unit is the output signal VS, as further delayed by the corresponding master variable delay unit.) Detector 69 generates a detect signal DS responsive to the detected phase difference. In each case, detector 69 is adapted to the remaining circuit (analog or digital).

Referring now more particularly to circuit 70, control unit 65 additionally includes an electric charge pump unit 72. Unit 72 generates a control signal CONT responsive to the detect signal DS. The voltage level of control signal CONT is proportional to the detect signal DS, by pumping electric charges according to the detect signal DS. It will be recognized that control signal CONT is an analog version of the adjustment control signal ADJ.

In circuit 70, the master variable delay unit 73 and the controllable delay unit 78 are implemented by voltage controlled variable delay (VCD) units. Their delay times are controlled by the voltage level of control signal CONT.

Referring now more particularly to circuit 80, control unit 65 additionally includes a register 82. Register 82 generates a control code signal CONT_CODE, responsive to the detect signal DS. It will be recognized that control code signal CONT_CODE is a digital version of the adjustment control signal ADJ. It may be either a voltage with many possible values, or a bus with N voltages that dials, by combination, a single delay, as will be seen below in FIG. 10.

In circuit 80, the master variable delay unit 83 and the controllable delay unit 88 are implemented by code controlled variable delay units. These may be made by a digital-to-time converter (DTC) unit. Their delay times are controlled by control code signal CONT_CODE.

Figure 9:
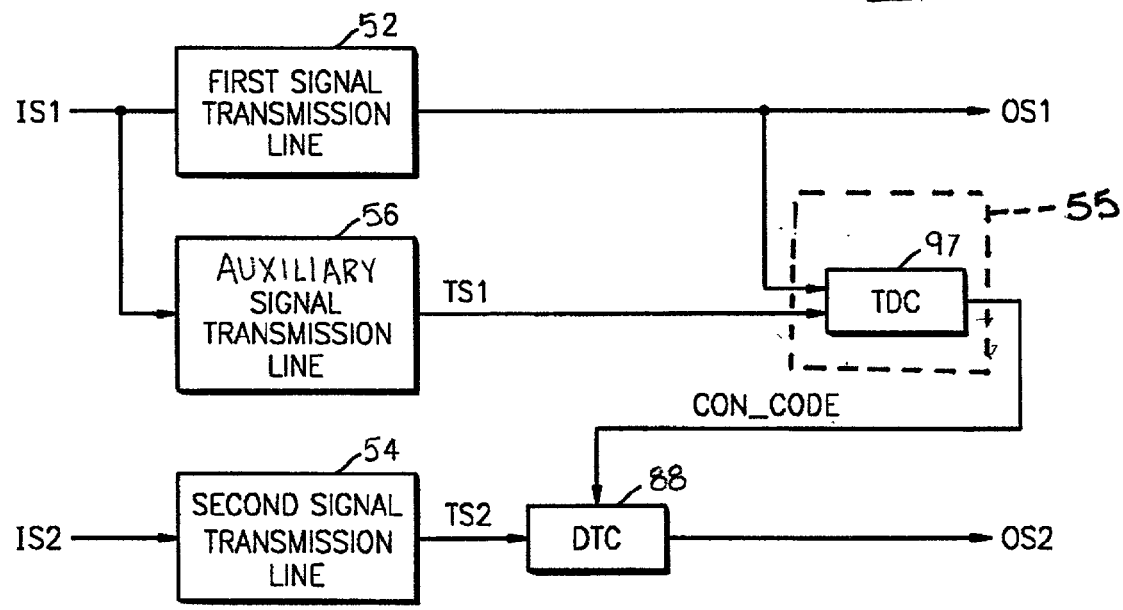
FIG. 9 is a diagram illustrating a fourth particular embodiment of the signal transmission circuit of FIG. 5 according to the present invention.

Referring now to FIG. 9, a circuit 90 is described that is made according to a fourth particular embodiment of circuit 50 of FIG. 5.

Controllable delay unit 58 may be implemented by DTC 88, same as described in connection with FIG. 8. Controlling unit 55 is adapted to generate a control code signal CONT_CODE according to a phase difference between the first output signal OS1 and the first temporary signal TS1. Unit 55 may be implemented by a control code generating unit 97, that may be made by a time-to-digital converter (TDC) unit. It will be recognized that control code signal CONT_CODE is another digital version of the adjustment control signal ADJ. A particular embodiment for unit 97 is given below, in FIG. 11.

The control code CON_CODE signal generated by control code generating unit 97 may have a voltage level that defined as follows:

CON_CODE=C1*DT  [Equation 1]

Here, CON_CODE represents a control code, C1 represents a first proportionality constant, and DT represents the time difference of the two signals input from the control code generating unit 97. In this art, depending on the perspective, definitions are given sometimes in terms of time differences, and sometimes in terms of phase differences.

The delay time of the code controlled variable delay 88 is defined as follows:

DELT=C2*CON_CODE  [Equation 2]

Here, CON_CODE represents a voltage level of a control code signal, C2 represents a second proportionality constant, and DELT represents a delay time of the code controlled variable delay unit 88.

When the proportional constants satisfy the following Equation, DT and DELT become identical.

C1*C2=1  [Equation 3]

Figure 10:
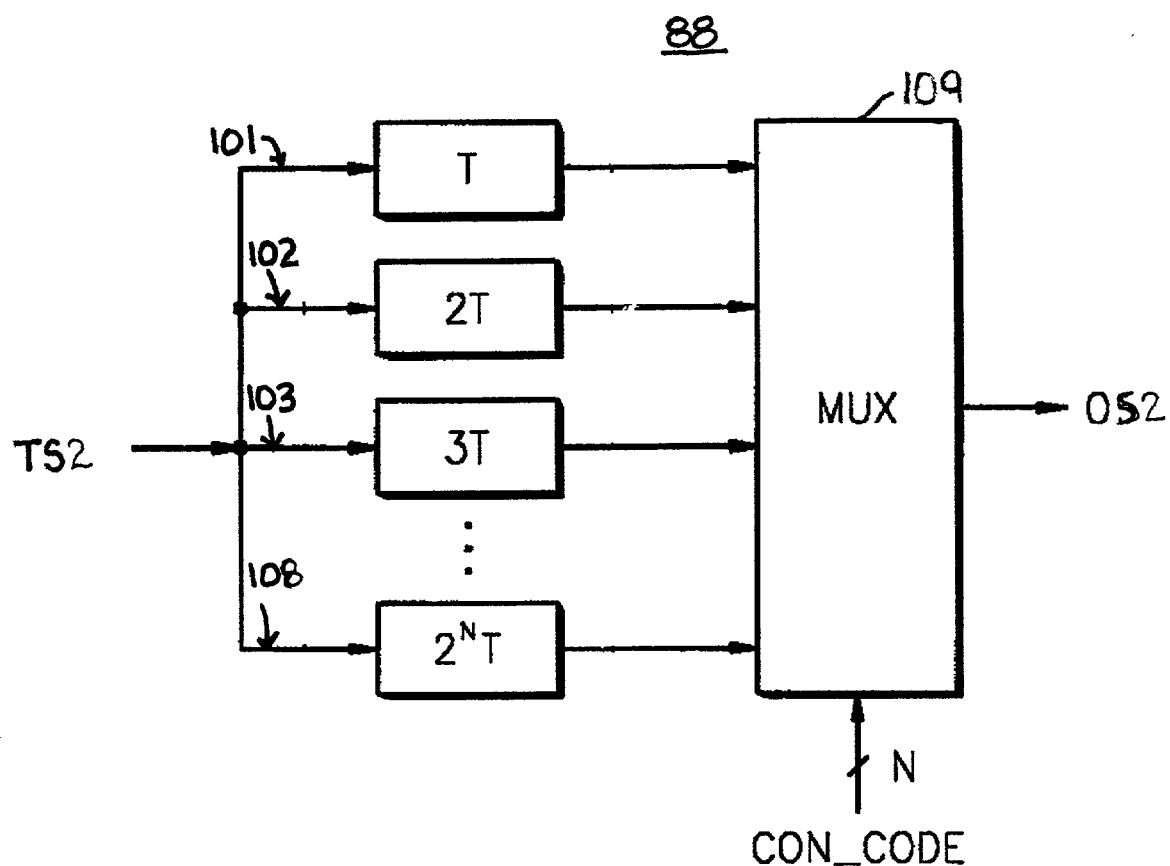
FIG. 10 is a diagram illustrating an embodiment of a code controlled variable delay unit used in the circuits of FIG. 8 and FIG. 9.

Referring now to FIG. 10, another embodiment is shown for controllable delay unit 88. It will be recognized that the embodiment of FIG. 10 is for when signal CONT_CODE is not a single signal, but a plurality of N signals whose combination carries a code.

In FIG. 10, a circuit 100 includes a plurality of delay branches 101, 102, 103, 108. Here only N=4 branches are shown, and more are implied. This is for illustration only, and any number is possible.

Each one of delay branches 101, 102, 103, 108 has an associated delay. The delays may be stratified, so that many delay options are made available. In the preferred embodiment, there are a total of $2^N$ delay elements, having delay times such as T, 2T, 3T, . . . , $2^N$T. Thus, the delay time can be selected by the signal CONT_CODE.

In FIG. 10, a multiplexer 109 receives the CONT_CODE signal. Multiplexer 109 selects one of delay branches 101, 102, 103, 108, responsive to the CONT_CODE signal. Here, the digital control code CON_CODE is comprised of N bits. Thus, one of the output signals of the 2N delay elements can be selected by the N bits of digital control code CON_CODE.

In the shown embodiment, all delay branches 101, 102, 103, 108 are joined at their beginnings. Second temporary signal TS2 is received by all delay branches 101, 102, 103, 108. Multiplexer 109 then selects which one of delay branches 101, 102, 103, 108, to allow to become the second output signal OS2.

In an equivalent second embodiment, second temporary signal TS2 is received by multiplexer 109. Multiplexer 109 then selects which one of delay branches 101, 102, 103, 108, to transmit it to. All delay branches 101, 102, 103, 108 are joined at their endings, which is where the second output signal OS2 is received. The second embodiment does not require boosting the input signal N times for each of the N branches.

As such, the delay time of the code controlled variable delay in the third and fourth embodiments is controlled to remain between T and $2^N$T by selecting one of the $2^N$ delay branches 101, 102, 103, 108.

Figure 11:
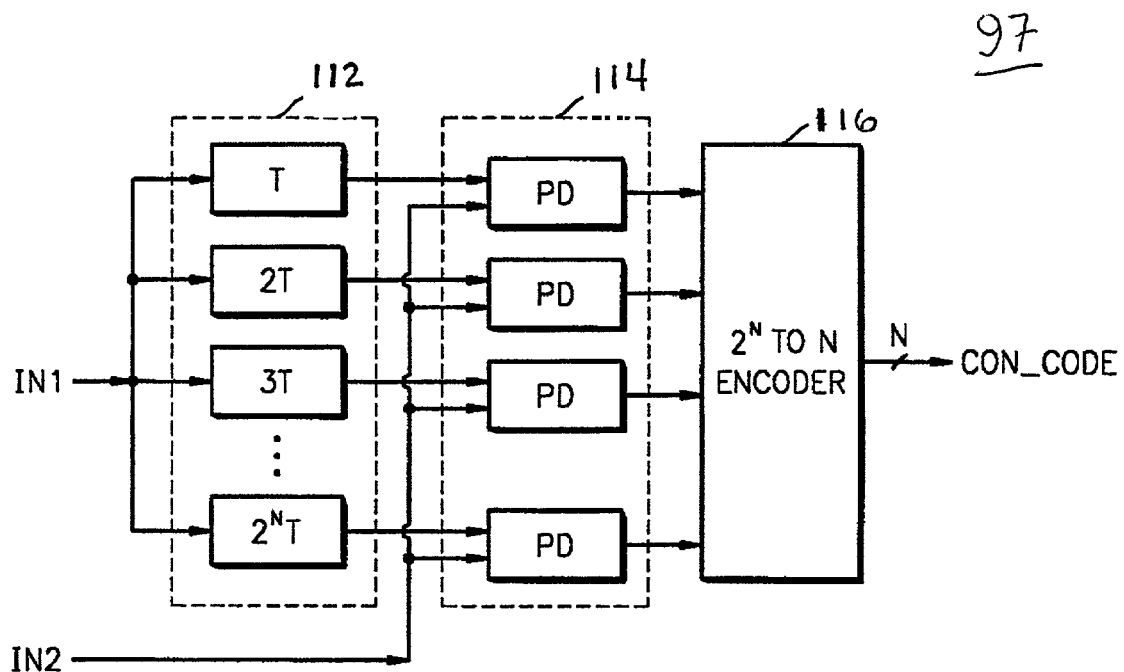
FIG. 11 is a diagram illustrating an embodiment of a control code generating unit used in the circuit of FIG. 9.

Referring now to FIG. 11, an embodiment is described of a control code generating unit 97 used in FIG. 9. It will be appreciated that it has an open loop structure, with a variable delay unit that is not connected to auxiliary signal transmission path 56. It will be apparent that, while the following description is given in terms of input signals IN1, IN2, these are respectively intended for TS1, OS1.

The circuit of FIG. 11 includes a plurality of delay elements 112, each of which receives the same first input signal IN1, a plurality of phase detectors 114, and an encoder 116. Each of the delay elements 112 has a predetermined delay time, by which it delays first input signal IN1 as it outputs it. Here, there are a total of $2^N$ delay elements having delay times such as T, 2T, 3T, . . . , $2^N$T. Output signals of the delay elements 112 are input to the respective ones of the phase detectors 114. Thus, the number of phase detectors 114 is the same as the number of delay elements 112. Each of the phase detectors 114 compares the output signal of its associated delay element with a second input signal IN2, and outputs its result as 1 bit signal i.e., a "1" or a "0". The encoder 116 receives output bits of the phase detectors 114 and generates N bits of digital control code CON_CODE. Therefore, the encoder 116 is a '$2^N$ to N' encoder for coding $2^N$ input signal bits into an N-bit output signal.

Figure 12:
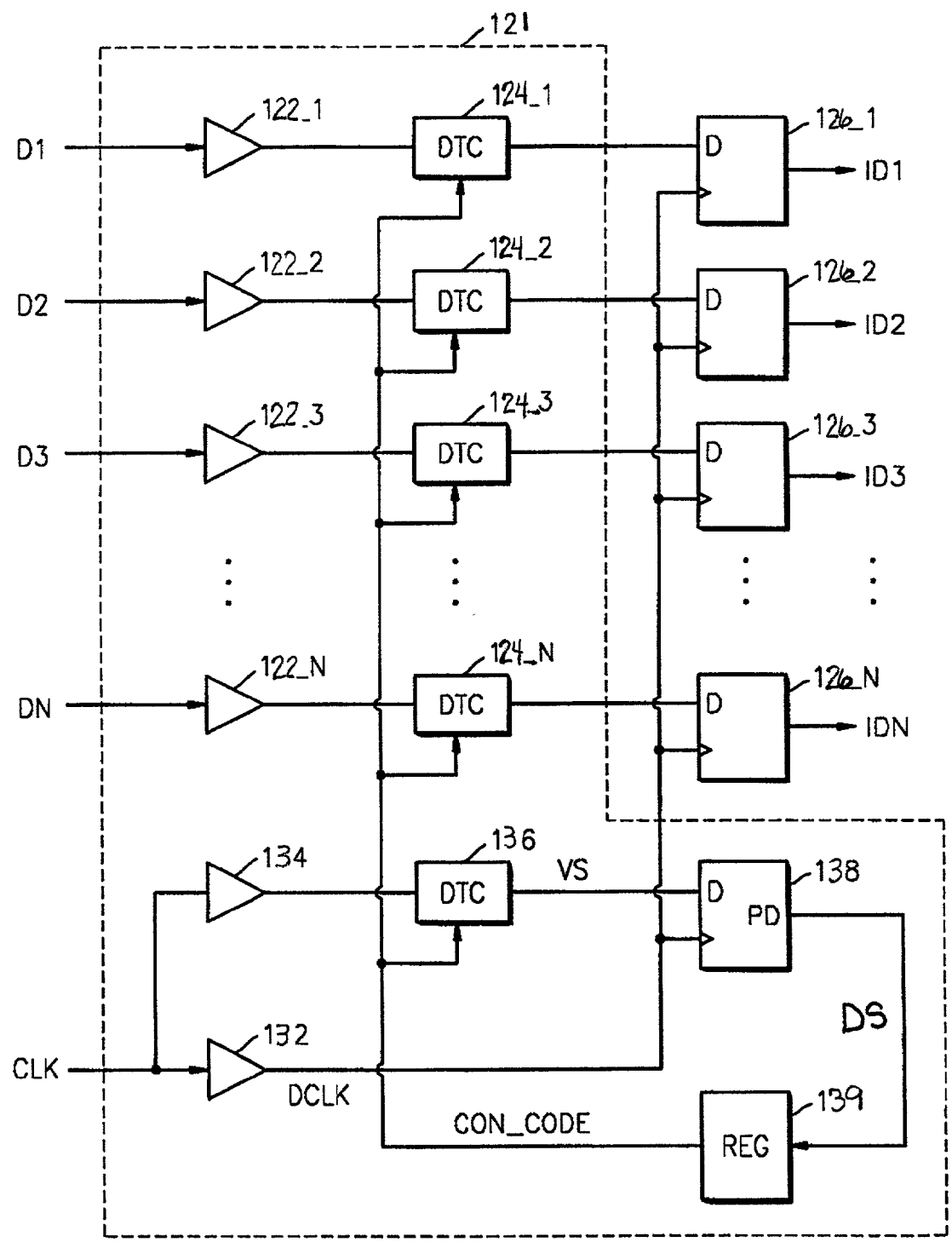
FIG. 12 is a diagram illustrating a data latch circuit of a semiconductor device according to an embodiment of the present invention.

Referring to FIG. 12, a data latch circuit 120 of a semiconductor device is described, which is made according to an embodiment of the present invention.

Circuit 120 includes a signal transmission circuit 121, and data latch elements 126_1 through 126_N. As mentioned above, signal transmission circuit 121 is a signal transmission circuit for equalizing different delay characteristics.

Circuit 121 is the same as that of circuit 80, with a plurality of N slave variable delay units. Equivalently, it could be made the same as that of circuit 60 or 70.

More particularly, circuit 121 includes a phase detector 138, a register 139, a master variable delay unit 136, and slave variable delay units 124_1 through 124_N. Circuit 121 also includes a clock signal transmission path 132, first through N-th data transmission paths 122_1 through 122_N, and an auxiliary signal transmission path 134. Here, the delay time of each of the first through N-th data transmission paths 122_1 through 122_N are equal. The delay time of auxiliary signal transmission path 134 is equal to the delay time of the first through N-th data transmission paths 122_1 through 122_N.

Master variable delay unit 136 is connected to auxiliary signal transmission path 134, and slave variable delay units 124_1 through 124_N are connected to each of the first through N-th data transmission paths 122_1 through 122_N.

Data latch circuit 120 receives a clock signal CLK and a plurality of data D1, D2, D3, . . ., DN via each of the input buffers and provides the data as internal data.

Circuit 126_1 through 126_N then latches data D1, D2, D3, . . ., DN received in response to a received clock signal, and provides the data as internal data. Thus, preferably, clock signal transmission path 132 is an input buffer for a clock signal, and the first through N-th data transmission paths 122_1 through 122-N are input buffers for data.

The problem that circuit 121 faces and solves successively is differential fan-out. Fan-out of the input buffer 132 for a clock is N, whereas fan-out of the input buffers 122_1 through 122_N for data is 1, so that a difference in delay time occurs. Thus, it is necessary for the delay time to be equalized by the signal transmission circuit of the present invention.

Circuit 121 operates as follows.

A clock signal CLK is input to the clock signal transmission path 132 and the auxiliary signal transmission path 134. An output signal DCLK of the clock signal transmission path 132 and an output signal VS of the master variable delay unit 136, which is connected to the auxiliary signal transmission path 134, are input in phase detector 138. Detector 138 outputs a signal DS into register 139. Signal DS indicates the detected phase difference between the two input signals VS and DCLK. Register 139 generates a control signal CON_CODE for controlling the delay time of master variable delay unit 136, and that of the slave variable delay units 124_1 through 124_N. When the control code CON_CODE is a digital code, the master variable delay unit 136 and each of the slave variable delay units 124_1 through 124_N must be code controlled variable delay units.

The control signal CON CODE is continuously controlled so that no phase difference develops between in the two signals VS and DCLK. Thus, eventually, the total delay time of the auxiliary signal transmission path 134 and the master variable delay unit 136 will become equal to the delay time of the clock signal transmission path 132. Accordingly, the total delay time of each data transmission path and each of the slave variable delay units will become equal to the delay time of the clock signal transmission path 132.

Output signals of the slave variable delay units 124_1 through 124_N are input to one input port of the corresponding data latch elements 126_1 through 126_N. An output signal DCLK of the clock signal transmission path 132 is input to another input port of each of the data latch elements 126_1 through 126_N. Each of the data latch elements 126_1 through 126_N latches data by adjusting data to the output signal DCLK of the input clock signal transmission path 132. Then it outputs that data as ID1, ID2, ID3, . . ., IDN.

Thus, the timing of the two signals input to each of the data latch elements 126_1 through 126_N can be precisely synchronized. Accordingly, the data setup and hold time of the latch elements are improved, and thus, operation speed can increase.

A flip-flop may be used for the data latch elements 126_1 through 126_N.

Thus, preferably, phase detector 138 also uses the same flip-flop as the flip-flop for latching data. By using the same flip-flop, a difference in characteristics of phase detector 138 and the data latch elements 126_1 through 126_N is compensated for.

Referring to FIG. 13, a flowchart 140 is used to illustrate a time delay compensation method according to an embodiment of the present invention. The method of flowchart 400 is as follows.

In a signal transmission circuit comprising different first and second signal transmission paths having different delay characteristics, an auxiliary signal transmission path and a master variable delay unit serially-connected to the auxiliary signal transmission path are additionally included (step 142). A slave variable delay unit serially-connected to the second signal transmission path is additionally included (step 144). Preferably, the master variable delay unit and the slave variable delay unit are delay units having the same delay characteristics and the same structure.

A first input signal is input to the first signal transmission path and to the auxiliary signal transmission path, and a second input signal is input to the second signal transmission path (step 146). A phase difference is detected by comparing the phase difference between an output signal of the first signal transmission path and an output signal of the master variable delay unit (step 148). When there is no phase difference, a control signal having a fixed value is generated (step 152). When there is a phase difference, a control signal corresponding to the phase difference is generated (step 150).

The delay time of the master variable delay unit is controlled by the control signal (step 154). A delay time of the slave variable delay unit is controlled to be equal to the delay time of the master variable delay unit by applying the control signal to the slave variable delay unit (step 156). Preferably, steps 148 through 156 are automatically repeated. Then, the control signal is continuously controlled so that there is no phase difference between the output signal of the first signal transmission path and the output signal of the master variable delay unit. Accordingly, as a consequence, the delay time of the first input signal and the delay time of the second input signal are equalized.

As described above, the preferred embodiments of the present invention are disclosed in the drawings and specification. Specific terms used in the preferred embodiments are intended to explain the present invention, and are not intended to limit the scope of the present invention as described in the claims. For example, the transmission paths may be clock signal transmission paths and data signal transmission paths. Therefore, it will be understood by those skilled in the art that various changes in form and details may be made therein without departing from the spirit and scope of the invention as defined by the appended claims.

What is claimed is:

1. A signal transmission circuit comprising:
    a first signal transmission path for receiving a first input signal, and for outputting a corresponding first output signal which is delayed by a first delay time from the first input signal;
    a second signal transmission path for receiving a second input signal distinct from the first input signal, and for outputting a corresponding second temporary signal which is delayed by a second delay time from the second input signal;
    an auxiliary signal transmission path for receiving the first input signal, and for outputting a first temporary signal having a third delay;

a master delay unit for generating a master output signal having a master delay;
a control unit for generating an adjustment control signal responsive to the first output signal and the master output signal; and
a slave delay unit for generating a second output signal responsive to the adjustment control signal.

2. The circuit of claim 1, wherein
the auxiliary signal transmission path is a replica of the second signal transmission path.

3. The circuit of claim 1, wherein
the adjustment control signal is such that the first delay time substantially equals the second delay time plus the internal delay time.

4. The circuit of claim 1, wherein
the control unit is implemented by a voltage controlled delay.

5. The circuit of claim 1, wherein the control unit comprises:
a plurality of delay branches; and
a multiplexer for selecting, responsive to the adjustment control signal, one of the delay branches.

6. The circuit of claim 1, wherein
the control unit is adapted to generate the adjustment control signal according to a phase difference between the first output signal and the first temporary signal.

7. A signal transmission circuit comprising:
a first signal transmission path for receiving a first input signal, and for outputting a corresponding first output signal which is delayed by a first delay time from the first input signal;
a second signal transmission path for receiving a second input signal distinct from the first input signal, and for outputting a corresponding second temporary signal which is delayed by a second delay time from the second input signal;
an auxiliary signal transmission path for receiving the first input signal, and for outputting a first temporary signal having a third delay associated with the second delay time;
a controlling unit for comparing the first output signal and the first temporary signal to generate an adjustment control signal; and
a controllable delay unit for receiving the adjustment control signal to adjust an internal delay time thereof, and for receiving the second temporary signal for outputting a second output signal which is delayed by the internal delay time from the second temporary signal;
wherein the controlling unit comprises:
a master variable delay unit adapted to receive the first temporary signal, and having a master internal delay which is controlled by the adjustment control signal; and
a control unit for receiving an output signal of the master variable delay unit end the first output signal to generate the adjustment control signal.

8. The circuit of claim 7, wherein
the master variable delay unit and the controllable delay unit are made identically, and
the master internal delay is controlled to substantially equal the internal delay of the controllable delay unit.

9. The circuit of claim 7, wherein the master variable delay unit comprises:
a plurality of delay branches; and
a multiplexer for selecting, responsive to the adjustment control signal, one of the delay branches.

10. The circuit of claim 7, wherein the control unit comprises:
a phase detector adapted to detect a phase difference between the first output signal and the output signal of the master variable delay unit, and to generate a detect signal responsive to the phase difference.

11. The circuit of claim 10, wherein the master variable delay unit comprises:
a plurality of delay branches; and
a multiplexer for selecting, responsive to the adjustment control signal, one of the delay branches.

12. The circuit of claim 10, wherein
the control unit further includes an electric charge pump unit for generating the adjustment control signal responsive to the detect signal, and
the master variable delay unit and the controllable delay unit are implemented by voltage controlled variable delay units.

13. A signal transmission circuit comprising:
a first signal transmission path for receiving a first input signal, and for outputting a corresponding first output signal which is delayed by a first delay time from the first input signal;
a second signal transmission path for receiving a second input signal, and for outputting a corresponding second temporary signal which is delayed by a second delay time from the second input signal;
an auxiliary signal transmission path for receiving the first input signal, and for outputting a first temporary signal having a third delay associated with the second delay time;
a controlling unit for comparing the first output signal and the first temporary signal to generate an adjustment control signal; and
a controllable delay unit for receiving the adjustment control signal to adjust an internal delay time thereof, and for receiving the second temporary signal for outputting a second output signal which is delayed by the internal delay time from the second temporary signal;
wherein the controlling unit includes:
a master variable delay unit adapted to receive the first temporary signal, and having a master internal delay which is controlled by the adjustment control signal; and
a control unit for receiving an output signal of the master variable delay unit and the first output signal to generate the adjustment control signal; and
wherein the control unit includes:
a phase detector adapted to detect a phase difference between the first output signal and the output signal of the master variable delay unit, and to generate a detect signal responsive to the phase difference; and
register for generating the adjustment control signal responsive to the detect signal; and
wherein the master variable delay unit and the controllable delay unit are implemented by code controlled variable delay units.

14. A signal transmission circuit comprising:
a first signal transmission path for receiving a first input signal, and for outputting a corresponding first output signal which is delayed by a first delay time from the first input signal;
a second signal transmission path for receiving a second input signal distinct from the first input signal, and for outputting a corresponding second temporary signal which is delayed by a second delay time from the second input signal;

an auxiliary signal transmission path for receiving the first input signal, and for outputting a first temporary signal having a third delay associated with the second delay time;

a controlling unit for comparing the first output signal and the first temporary signal to generate an adjustment control signal; and a controllable delay unit for receiving the adjustment control signal to adjust an internal delay time thereof and for receiving the second temporary signal for outputting a second output signal which is delayed by the internal delay time from the second temporary signal;

wherein the controlling unit is adapted to generate the adjustment control signal according to a phase difference between the first output signal and the first temporary signal, wherein the adjustment control signal has a voltage level proportional to the phase difference according to a first proportionality constant, and wherein the internal delay time has a magnitude proportional to the voltage level of the adjustment control signal according to a second proportionality constant.

15. The circuit of claim 14, wherein
the product of the first proportionality constant and the second proportionality constant substantially equals one.

16. A signal transmission circuit comprising:
a first signal transmission path for receiving a first input signal, and for outputting a corresponding first output signal which is delayed by a first delay time from the first input signal;

a second signal transmission path for receiving a second input signal, and for outputting a corresponding second temporary signal which is delayed by a second delay time from the second input signal;

an auxiliary signal transmission path for receiving the first input signal, and for outputting a first temporary signal having a third delay associated with the second delay time;

a controlling unit for comparing the first output signal and the first temporary signal to generate an adjustment control signal; and a controllable delay unit for receiving the adjustment control signal to adjust an internal delay time thereof, and for receiving the second temporary signal for outputting a second output signal which is delayed by the internal delay time from the second temporary signal;

wherein the controlling unit is adapted to generate the adjustment control signal according to a phase difference between the first output signal and the first temporary signal, wherein the controlling unit comprises:
a plurality of delay elements, each of which delays the first temporary signal by a predetermined delay time and outputs a delayed output signal;

phase detectors corresponding the plurality of delay elements, each of the phase detectors for outputting phase comparison signals by comparing the phase of one signal of the output signals of the delay elements with the phase of the first signal transmission path; and an encoder for receiving each of the phase comparison signals output from the phase detectors and generating the control code.

17. A data latch circuit of a semiconductor device comprising:
a reference signal transmission path for delaying a reference signal by a predetermined first delay time and outputting a delayed reference signal;

first through N-th data transmission paths for delaying first through N-th input data by a predetermined second delay time, respectively, and outputting delayed data of each of the input data;

an auxiliary signal transmission path having delay characteristics identical with those of the first data transmission path, for receiving the reference signal;

a master variable delay unit serially-connected to the auxiliary signal transmission path, and having a delay time which is controlled by a control signal;

first through N-th slave variable delay units serially-connected to the first through N-th data transmission paths, respectively, and having delay times which are controlled by the control signal;

a control unit for receiving an output signal of the master variable delay unit and an output signal of the reference signal transmission path, and for generating the control signal in response thereto; and first through N-th data latch means for receiving output signals of the first through N-th slave variable delay units, respectively, responsive to the delayed reference signal.

18. The circuit of claim 17, wherein the control unit comprises:
a phase detector adapted to detect a phase difference between the output signal of the reference signal transmission path and the output signal of the master variable delay unit, and to generate a detect signal responsive to the phase difference.

19. The circuit of claim 18, wherein
the control unit further includes an electric charge pump unit for generating the control signal responsive to the detect signal, and
the master variable delay unit and the first through N-th slave variable delay units are voltage controlled variable delay units.

20. The circuit of claim 18, wherein
the control unit further includes a register for generating the control signal responsive to the detect signal, and
the master variable delay unit and the first through N-th slave variable delay units are digital code controlled variable delay units.

21. The circuit of claim 18, wherein the first through N-th data latch means and the phase detector are flip-flops.

22. A signal transmission method implemented in a signal transmission circuit having first and second signal transmission paths, each of which has different delay characteristics, the method comprising the steps of:
additionally including an auxiliary signal transmission path having delay characteristics identical with the second signal transmission path end a master variable delay unit serially-connected to the auxiliary signal transmission path;

additionally including a slave variable delay unit serially-connected to the second signal transmission path;

inputting a first input signal to the first signal transmission path and the auxiliary signal transmission path, and inputting a second input signal distinct from the first input signal to the second signal transmission path;

generating a control signal corresponding to the phase difference obtained by comparing the phase of an output signal of the first signal transmission path with the phase of an output signal of the master variable delay unit;

controlling the delay time of the master variable delay unit by applying the control signal to the master variable delay unit; and controlling the delay time of the slave variable delay unit to be identical with the delay time of the master variable delay unit by applying the control signal to the slave variable delay unit.

23. A signal transmission circuit comprising:

a first signal transmission path for receiving a first input signal, and for outputting a corresponding first output signal which is delayed by a first delay time from the first input signal;

a second signal transmission path for receiving a second input signal distinct from the first input signal, and for outputting a corresponding second temporary signal which is delayed by a second delay time from the second input signal;

an auxiliary signal transmission path which is a replica of the second signal transmission path, far receiving the first input signal, and for outputting a first temporary signal which is delayed by the second delay time from the first input signal;

a controllable delay unit for receiving an adjustment control signal to adjust an internal delay time thereof, and for receiving the second temporary signal for outputting a second output signal which is delayed by the internal delay time from the second temporary signal;

a master delay unit for generating a master delay signal responsive to the first temporary signal; and a control unit for generating the adjustment control signal responsive to the first temporary signal and the first output signal.

24. The signal transmission circuit of claim 23 wherein the sum of the second delay time and the internal delay time is controlled to substantially equal the first delay time.

25. A signal transmission circuit comprising:

a first signal transmission path for receiving a first input signal, and for outputting a corresponding first output signal which is delayed by a first delay time from the first input signal;

a second signal transmission path for receiving a second input signal distinct from the first input signal, and for outputting a corresponding second temporary signal which is delayed by a second delay time from the second input signal;

an auxiliary signal transmission path which is a replica of the second signal transmission path, for receiving the first input signal, and for outputting a first temporary signal which is delayed by the second delay time from the first input signal;

a controlling unit comprising a master variable delay unit for receiving the first temporary signal and an adjustment control signal, and a control unit for comparing the output signal of the master variable delay unit and the first output signal, and generating the adjustment control signal; and a slave variable delay unit for receiving the adjustment control signal to adjust an internal delay time thereof, and for receiving the second temporary signal for outputting a second output signal which is delayed by the internal delay time from the second temporary signal, wherein the sum of the second delay time and the internal delay time is controlled to substantially equal the first delay time.

26. A signal transmission circuit comprising:

a clock signal transmission path for receiving a clock input signal, and for outputting a corresponding clock output signal which is delayed by a first delay time from the clock input signal;

at least one data signal transmission path for receiving a data input signal, and for outputting a corresponding data temporary signal which is delayed by a second delay time from the data input signal;

an auxiliary signal transmission path which is a replica of the at least one data signal transmission path, for receiving the clock input signal, and for outputting a clock temporary signal which is delayed by the second delay time from the clock input signal;

a master variable delay unit to generate a master output signal responsive to a control signal and the clock signal delayed by the first delay time;

at least one slave delay unit corresponding the at least one data transmission path adapted to operate responsive to the control signal;

a phase detector for generating a phase signal to indicate a phase difference between the clock signal delayed by the first delay time and the master output signal; and a control unit to generate the control signal responsive to the phase signal.

27. A signal transmission circuit comprising:

a clock signal transmission path for receiving a clock input signal, and for outputting a corresponding clock output signal which is delayed by a first delay time from the clock input signal;

a data signal transmission path for receiving a data input signal, and for outputting a corresponding data temporary signal which is delayed by a second delay time from the data input signal;

an auxiliary signal transmission path which is a replica of the data signal transmission path, for receiving the clock input signal, and for outputting a clock temporary signal which is delayed by the second delay time from the clock input signal;

a controlling unit comprising a master variable delay unit for receiving the clock temporary signal and an adjustment control signal, and a control unit for comparing the output signal of the master variable delay unit and the clock output signal, and generating the adjustment control signal; and a slave variable delay unit for receiving the adjustment control signal to adjust an internal delay time thereof, and for receiving the data temporary signal for outputting a data output signal which is delayed by the internal delay time from the data temporary signal.

28. A signal transmission circuit comprising:

a clock signal transmission path for receiving a clock input signal, and for outputting a corresponding clock output signal which is delayed by a first delay time from the clock input signal;

a data signal transmission path for receiving a data input signal, and for outputting a corresponding data temporary signal which is delayed by a second delay time from the data input signal;

an auxiliary signal transmission path which is a replica of the data signal transmission path, for receiving the clock input signal, and for outputting a clock temporary signal which is delayed by the second delay time from the clock input signal;

a controlling unit comprising a first voltage controlled variable delay unit for receiving the clock temporary signal and an adjustment control signal, and a phase detector for detecting a phase difference between the output signal of the first voltage controlled variable delay unit and the clock output signal and generating a detect signal responsive to the phase difference, and an electric charge pump unit for generating the adjustment control signal responsive to the detect signal; and a second voltage controlled variable delay unit for receiving the adjustment control signal to adjust an internal delay time thereof, and for receiving the data temporary signal for outputting a data output signal which is delayed by the internal delay time from the data temporary signal, wherein the sum of the second delay time and the internal delay time is substantially controlled to equal the first delay time.

29. A signal transmission circuit comprising:

a clock signal transmission path for receiving a clock input signal, and for outputting a corresponding clock output signal which is delayed by a first delay time from the clock input signal;

a data signal transmission path for receiving a data input signal, and for outputting a corresponding data temporary signal which is delayed by a second delay time from the data input signal;

an auxiliary signal transmission path which is a replica of the data signal transmission path, for receiving the clock input signal, and for outputting a clock temporary signal which is delayed by the second delay time from the clock input signal;

a controlling unit comprising a first digital code controlled variable delay unit for receiving the clock temporary signal and a digital code signal, and a phase detector for detecting a phase difference between the output signal of the first digital code controlled variable delay unit and the clock output signal and generating a detect signal responsive to the phase difference, and a register for generating the digital code signal responsive to the detect signal; and a second digital code controlled variable delay unit for receiving the digital code signal to adjust an internal delay time thereof, and for receiving the data temporary signal for outputting a data output signal which is delayed by the internal delay time from the data temporary signal, wherein the sum of the second delay time and the internal delay time is controlled to substantially equal the first delay time.

\* \* \* \* \*

UNITED STATES PATENT AND TRADEMARK OFFICE
CERTIFICATE OF CORRECTION

PATENT NO. : 7,085,336 B2  
APPLICATION NO. : 09/875364  
DATED : August 1, 2006  
INVENTOR(S) : Jung-bae Lee et al.

It is certified that error appears in the above-identified patent and that said Letters Patent is hereby corrected as shown below:

Column 6, line 7, the word "2N" should read -- $2^N$ --;

Column 7, line 18, the word "122-N" should read -- 122_N --;

Column 9, line 56, the word "end" should read -- and --;

Column 10, line 55, the word "register" should read -- a register --;

Column 11, line 12, the word "thereof" should read -- thereof, --;

Column 12, line 59, the word "end" should read -- and --;

Column 13, line 23, the word "far" should read -- for --.

Signed and Sealed this

Twenty-eighth Day of July, 2009

JOHN DOLL  
*Acting Director of the United States Patent and Trademark Office*